US008362989B2

(12) United States Patent
Tung et al.

(10) Patent No.: US 8,362,989 B2
(45) Date of Patent: Jan. 29, 2013

(54) LIQUID CRYSTAL DISPLAY DEVICE WITH PERIODICAL CHANGED VOLTAGE DIFFERENCE BETWEEN DATA VOLTAGE AND COMMON VOLTAGE AND DRIVING METHOD THEREOF

(75) Inventors: Chien-Fan Tung, Miao-Li (TW); Shun-Ming Huang, Shenzhen (CN)

(73) Assignees: Innocom Technology (Shenzhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 1402 days.

(21) Appl. No.: 12/011,970

(22) Filed: Jan. 29, 2008

(65) Prior Publication Data

US 2008/0180419 A1 Jul. 31, 2008

(30) Foreign Application Priority Data

Jan. 29, 2007 (TW) ................................ 96103140 A

(51) Int. Cl.
*G09G 3/36* (2006.01)
*G09G 3/18* (2006.01)
*G06F 3/038* (2006.01)

(52) U.S. Cl. ............................ 345/87; 345/50; 345/204

(58) Field of Classification Search .............. 345/50–54, 345/87, 204

See application file for complete search history.

(56) References Cited

U.S. PATENT DOCUMENTS

| | | | | |
|---|---|---|---|---|
| 6,977,637 | B2 | 12/2005 | Ikeda et al. | |
| 2004/0075484 | A1 * | 4/2004 | Nishizono et al. ............ | 327/345 |
| 2005/0162363 | A1 | 7/2005 | Kim | |

FOREIGN PATENT DOCUMENTS

| | | | |
|---|---|---|---|
| CN | 1637488 | A | 7/2005 |

* cited by examiner

*Primary Examiner* — Waseem Moorad

(74) *Attorney, Agent, or Firm* — WPAT PC; Justin King

(57) ABSTRACT

An exemplary liquid crystal display device (20) includes a plurality of pixel electrode (26), a common electrode (22), a data driving circuit (33) configured for providing data voltages to each pixel electrode, and a common voltage generating circuit (34) configured for providing a common voltage to the common electrode. The common voltage generating circuit includes a hysteresis comparator circuit (341) and a direct current voltage adjusting circuit (343). The hysteresis comparator circuit is configured for providing an alternating current voltage, and the direct current voltage adjusting circuit is configured for providing a direct current voltage with periodic change. The direct current voltage is configured for superimposing on the alternating current voltage to form a common voltage, and an absolute value of the common voltage changes only slightly within a predetermined range from each frame to the next adjacent frame. A method for driving the liquid crystal display device is also provided.

12 Claims, 6 Drawing Sheets

LIQUID CRYSTAL DISPLAY DEVICE WITH PERIODICAL CHANGED VOLTAGE DIFFERENCE BETWEEN DATA VOLTAGE AND COMMON VOLTAGE AND DRIVING METHOD THEREOF

FIELD OF THE INVENTION

The present invention relates to liquid crystal display (LCD) devices, and more particularly to an LCD device with a periodically changed voltage difference between a data voltage and a common voltage. The present invention also relates to a method for driving the LCD device.

GENERAL BACKGROUND

A typical LCD device includes a multiplicity of pixel units and liquid crystal molecules at the pixel units. The LCD device utilizes the liquid crystal molecules to control light transmissivity of each pixel unit. The liquid crystal molecules are driven according to external video signals received by the LCD device. A conventional LCD device generally employs an inversion driving method to drive the liquid crystal molecules, in order to protect the liquid crystal molecules from decay or damage.

Referring to FIG. 7, a schematic, exploded, side cross-sectional view of a conventional LCD device is shown. The LCD device 10 includes a first substrate 11, a common electrode 12, a first alignment film 13, a liquid crystal layer 14, a second alignment film 15, a plurality of pixel electrodes 16, and a second substrate 17. The first substrate 11 is parallel to the second substrate 17. The common electrode 12 is disposed on an inner surface of the first substrate 11. The plurality of pixel electrodes 16 are disposed on an inner surface of the second substrate 17, and are arranged in a matrix. The first alignment film 13 is coated on the common electrode 12, and the second alignment film 15 is coated on the plurality of pixel electrodes 16. The liquid crystal layer 14 is sandwiched between the first alignment film 13 and the second alignment film 15. Each of the pixel electrodes 16, part of the common electrode 12 generally opposite to the pixel electrode 16, and liquid crystal molecules (not labeled) sandwiched therebetween cooperatively define a pixel unit (not labeled).

Data voltages generated by a data driving circuit (not shown) are provided to the plurality of pixel electrodes 16, and a common voltage generated by a common voltage generating circuit (not shown) is provided to the common electrode 12. In each pixel unit, an electric field is generated between the pixel electrode 16 and the common electrode 12. The electric field controls rotating angles of the liquid crystal molecules of the pixel unit, and the rotating angles determine the light transmissivity of the pixel unit. The light transmissivity of each pixel unit determines a brightness of the pixel unit. The LCD device 10 displays images by controlling the brightness of each of the pixel units.

Referring also to FIG. 8, a waveform diagram of the data voltage and the common voltage applied to one of the pixel units is shown. In frame n−1, a value of the data voltage is Vdata1, and a value of the common voltage is Vcom1, where $Vdata1<0$, $Vcom1<0$, and $Vdata1>Vcom1$. A value of the electric field of the pixel unit is $(Vdata1-Vcom1)/d$, where d is a vertical distance between the common electrode 12 and the pixel electrode 16. A direction of the electric field of the pixel unit is from the pixel electrode 16 to the common electrode 12. In frame n, the value of the data voltage is Vdata2, and the value of the common voltage is Vcom2, where $Vdata2>0$, $Vcom2>0$, $Vdata2<Vcom2$, $Vcom2=-Vcom1$, and $Vcom2-Vdata2=Vdata1-Vcom1$. The value of the electric field of the pixel unit is $(Vdata2-Vcom2)/d$. The direction of the electric field of the pixel unit is from the common electrode 12 to the pixel electrode 16. In frame n+1, the value of the data voltage is Vdata1, and the value of the common voltage is Vcom1. The direction of the electric field of the pixel unit in frame n+1 is the same as that in frame n−1. That is, frame n−1 and frame n define a minimum period. The value and the direction of the electric field of the pixel unit in the following frames periodically repeat.

In each two adjacent frames, the two polarities of the data voltage are opposite, and the two polarities of the common voltage are also opposite accordingly. However, the absolute value of the common voltage is the same, and the absolute value of the voltage difference between the common voltage and the data voltage is the same. Therefore with each successive frame, the direction of the electric field of each pixel unit alternately changes, but the absolute value of the electric field of the pixel unit remains constant. The rotating angles of the liquid crystal molecules of each pixel unit are determined only by the absolute value of the electric field of the pixel unit. That is, when the absolute value of the electric field of the pixel unit is constant, the rotating angles of the liquid crystal molecules of the pixel unit are also constant.

Typically, the liquid crystal layer 14 is not pure. For example, a plurality of impurity ions (not shown) is mixed in the liquid crystal layer 14. The first and second alignment films 13 and 15 are made of organic materials, and capture the impurity ions easily. When the absolute value of the electric field of each pixel unit remains constant for a long time, the rotating angles of the liquid crystal molecules of the pixel unit are correspondingly constant. That is, the liquid crystal molecules have little effect on random motions of the impurity ions. Thus some of the impurity ions are captured by the first and second alignment films 13 and 15, and a residual direct current electric field (not shown) is generated between the first alignment film 13 and the second alignment film 15. Even if the direction of the electric field of the pixel unit changes, the residual direct current electric field may still subsist. The residual direct current electric field also drives the liquid crystal molecules to rotate. In any one frame, the residual direct current electric field may alter the rotating angle of each liquid crystal molecule. In addition, from frame to frame, the residual direct current electric field may cause each liquid crystal molecule to stay in the same position as the previous frame even when the liquid crystal molecule is being driven according to a video signal to change its rotating angle. Thus images of previous frames may continue to be viewed by a user. This problem is known as the residual image phenomenon.

What is needed, therefore, is an LCD device and a related driving method for the LCD device which can overcome the above-described deficiencies.

SUMMARY

In one aspect, a liquid crystal display device includes a plurality of pixel electrodes, a common electrode, a data driving circuit configured for providing data voltages to each pixel electrode, and a common voltage generating circuit configured for providing a common voltage to the common electrode. The common voltage generating circuit includes a hysteresis comparator circuit and a direct current voltage adjusting circuit. The hysteresis comparator circuit is configured for providing an alternating current voltage, and the direct current voltage adjusting circuit is configured for providing a direct current voltage with periodic change. The direct current voltage is configured for superimposing on the alternating current voltage to form a common voltage, and an absolute value of the common voltage changes only slightly within a predetermined range from each frame to the next adjacent frame.

In another aspect, a liquid crystal display device includes a plurality of pixel electrodes, a common electrode, a data driving circuit configured for providing data voltages to each pixel electrode, and a common voltage generating circuit configured for providing a common voltage to the common electrode. The common voltage is a sum of a main common voltage with alternating polarity and an auxiliary voltage with periodic change from frame to frame, and an absolute value of the common voltage changes only slightly within a predetermined range from each frame to the next adjacent frame.

In still another aspect, a method for driving a liquid crystal display device includes the following steps: providing a liquid crystal display device including a plurality of pixel electrodes, a common electrode, a data driving circuit, and a common voltage generating circuit; providing a common voltage to the common electrode by the common voltage generating circuit; and providing a plurality of data voltages to each pixel electrode by the data driving circuit. The common voltage is a sum of a main common voltage with alternating polarity and an auxiliary voltage with periodic change from frame to frame, and an absolute value of the common voltage changes only slightly within a predetermined range from each frame to the next adjacent frame.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe various embodiments of the present invention in detail.

Figure 1:
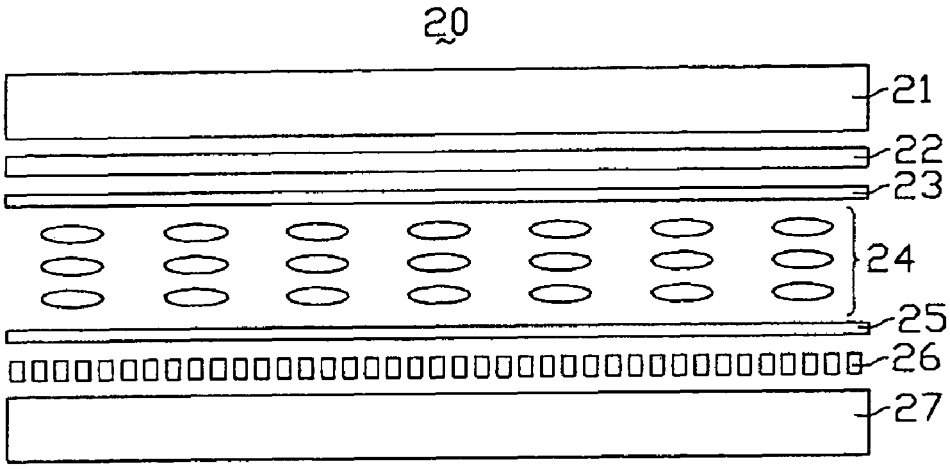
FIG. 1 is an exploded, side cross-sectional view of an LCD device according to a first embodiment of the present invention.

FIG. 1 is a schematic, exploded, side cross-sectional view of an LCD device according to a first embodiment of the present invention. The LCD device 20 includes a first substrate 21, a common electrode 22, a first alignment film 23, a liquid crystal layer 24, a second alignment film 25, a plurality of pixel electrodes 26, and a second substrate 27. The first substrate 21 is parallel to the second substrate 27. The common electrode 22 is disposed on an inner surface of the first substrate 21. The plurality of pixel electrodes 26 are disposed on an inner surface of the second substrate 27, and are arranged in a matrix. The first alignment film 23 is coated on the common electrode 22, and the second alignment film 25 is coated on the plurality of pixel electrodes 26. The liquid crystal layer 24 is sandwiched between the first alignment film 23 and the second alignment film 25. Typically, the liquid crystal layer 24 is not pure. For example, a plurality of impurity ions (not shown) may be mixed in the liquid crystal layer 24. Each pixel electrode 26, part of the common electrode 22 generally opposite to the pixel electrode 26, and liquid crystal molecules sandwiched therebetween cooperatively define a pixel unit (not labeled).

Figure 2:
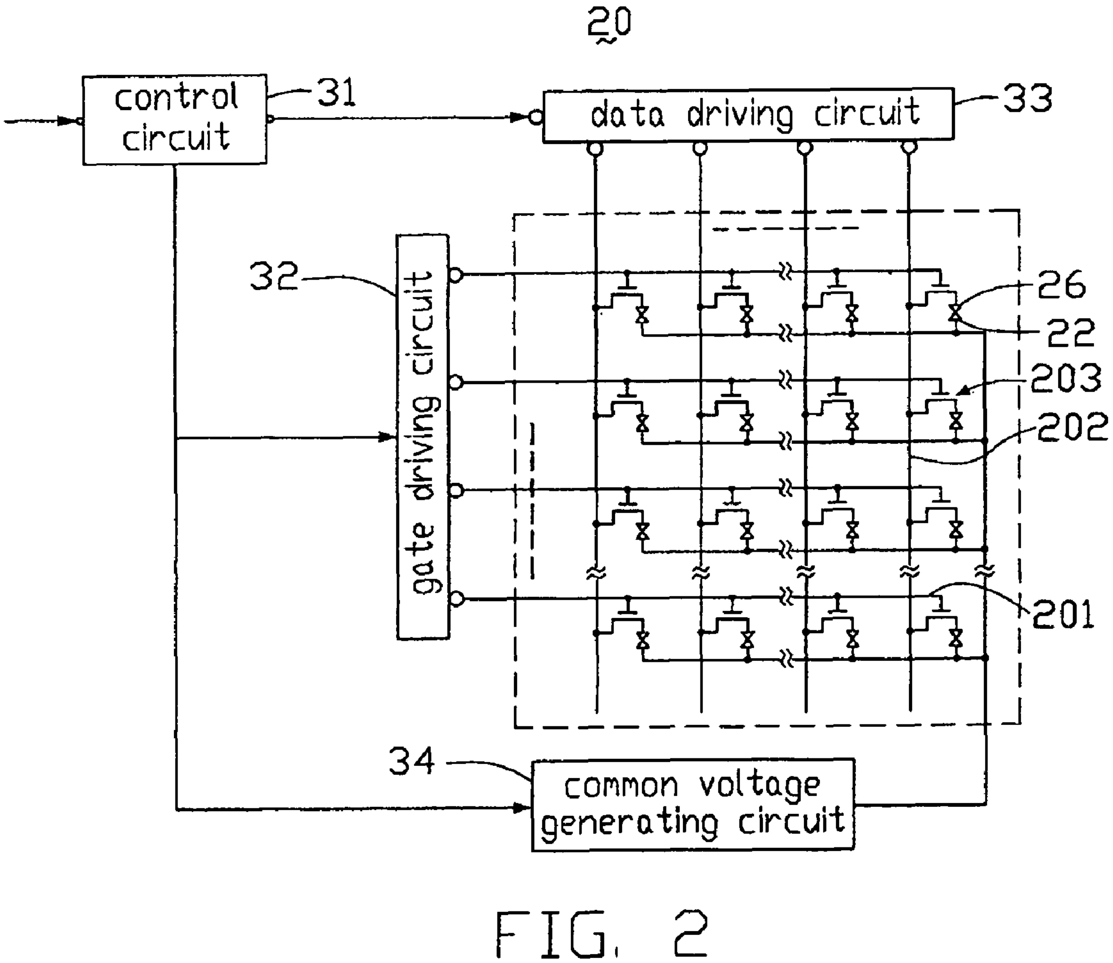
FIG. 2 is essentially an abbreviated circuit diagram of the LCD device of the first embodiment, the LCD device having a common voltage generating circuit and a plurality of pixel units.

FIG. 2 is essentially an abbreviated circuit diagram of the LCD device 20. The LCD device 20 further includes a control circuit 31, a gate driving circuit 32, a data driving circuit 33, and a common voltage generating circuit 34. The second substrate 27 includes a plurality of gate lines 201, a plurality of data lines 202, and a plurality of thin film transistors (TFTs) 203. The plurality of gate lines 201 are parallel to each other, and each gate line 201 extends along a first direction. The plurality of data lines 202 are parallel to each other, and each data line 202 extends along a second direction perpendicular to the first direction. Each TFT 203 is positioned near a respective crossing of one of the gate lines 201 and one of the data lines 202. Each TFT 203 includes a gate electrode (not labeled), a source electrode (not labeled), and a drain electrode (not labeled). The gate electrode of each TFT 203 is connected to the corresponding gate line 201, and the source electrode of each TFT 203 is connected to the corresponding data line 202. Further, the drain electrode of each TFT 203 is connected to a corresponding pixel electrode 26.

The control circuit 31 receives and processes external signals, generates control signals, and transmits the control signals to the gate driving circuit 32, the data driving circuit 33, and the common voltage generating circuit 34. The common voltage generating circuit 34 provides common voltages to the common electrode 22. The gate driving circuit 32 provides the scanning signals to the gate lines 201 to turn on corresponding TFTs 203. The data driving circuit 33 provides the data voltages to the data lines 202, and the data voltages are provided to the pixel electrodes 26 via the drain electrodes of the corresponding TFTs 203 when the gate lines 201 are scanned. In each pixel unit, if the corresponding TFT 203 is turned on, an electric field is generated between the pixel electrode 26 and the common electrode 22. The electric field controls rotating angles of the liquid crystal molecules of the pixel unit, and the rotating angles determine a light transmissivity of the pixel unit. The light transmissivity of the pixel unit determines a brightness of the pixel unit. The LCD device 20 displays images by controlling the brightness of each of the pixel units.

Figure 3:
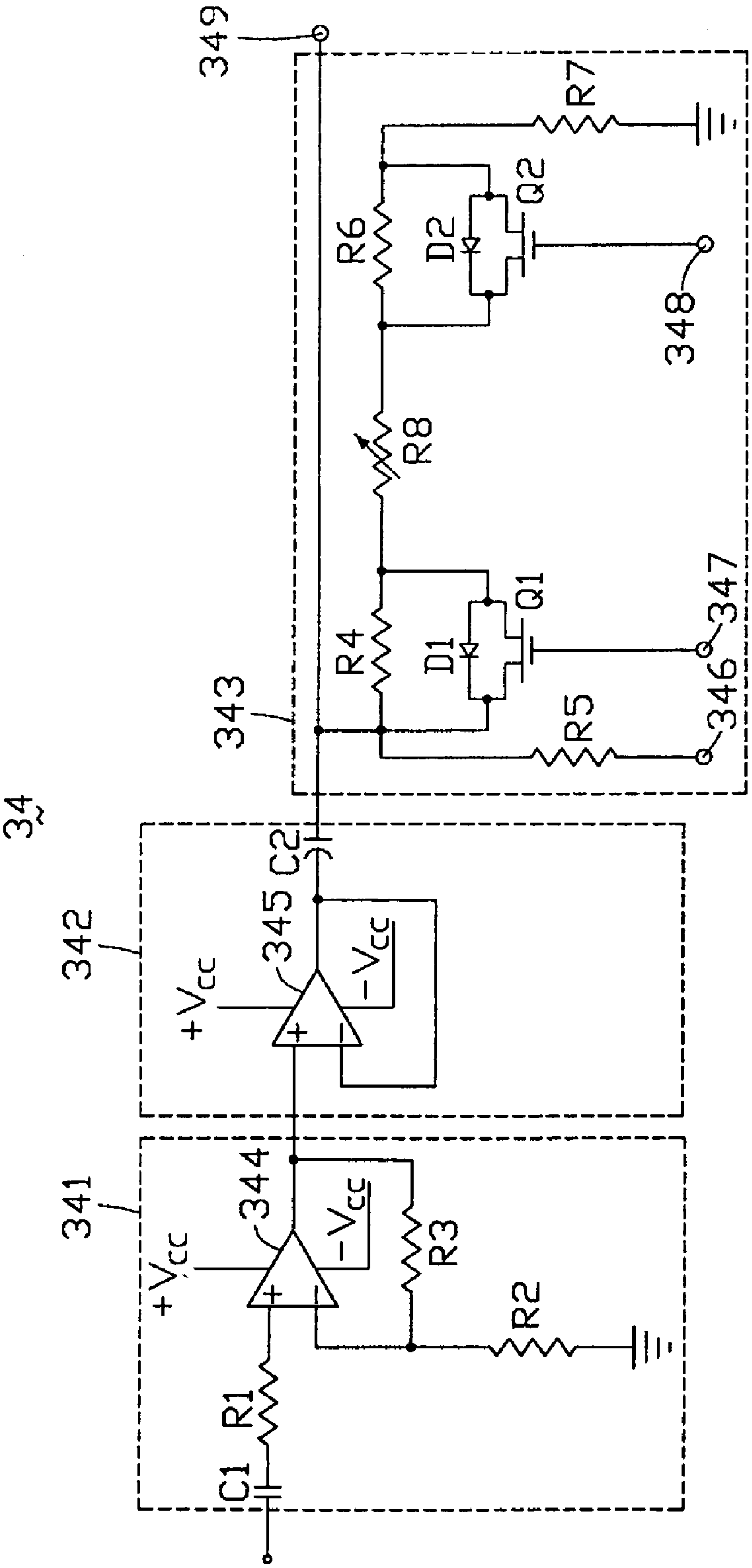
FIG. 3 is a diagram of the common voltage generating circuit of FIG. 2, the common voltage generating circuit having a first input terminal and a second input terminal.

FIG. 3 is a diagram of the common voltage generating circuit 34. The common voltage generating circuit 34 includes a hysteresis comparator circuit 341, a buffer circuit 342, a direct current voltage adjusting circuit 343, and a common voltage output terminal 349.

The hysteresis comparator circuit 341 includes a first resistor R1, a second resistor R2, a third resistor R3, a first capacitor C1, and a first operational amplifier 344. The first operational amplifier 344 may be an amplifier with positive-negative dual power supply. In such case, the first operational amplifier 344 includes a positive power terminal (not labeled) and a negative power terminal (not labeled). One terminal (not labeled) of the capacitor C1 is used for receiving signals from the control circuit 31, and the other terminal (not labeled) of the capacitor C1 is connected to a positive input terminal (not labeled) of the first operational amplifier 344 via the first resistor R1. A negative input terminal (not labeled) of the first operational amplifier 344 is grounded via the second resistor R2. The third resistor R3 is connected between the negative input terminal and an output terminal (not labeled) of the first operational amplifier 344.

The buffer circuit 342 includes a second operational amplifier 345 and a second capacitor C2. The second operational amplifier 345 may be an amplifier with positive-negative dual power supply. In such case, the second operational amplifier 345 includes a positive power terminal (not labeled) and a negative power terminal (not labeled). A positive input terminal (not labeled) of the second operational amplifier 345 is connected to the output terminal of the first operational amplifier 344, and a negative input terminal (not labeled) of the second operational amplifier 345 is connected to an output terminal (not labeled) of the second operational amplifier 345. The second capacitor C2 may be an electrolytic capacitor. A positive terminal (not labeled) of the second capacitor C2 is connected to the negative input terminal of the second operational amplifier 345, and a negative terminal (not labeled) of the second capacitor C2 is connected to the common voltage output terminal 349. The buffer circuit 342 can effectively remove burr waves generated by the hysteresis comparator circuit 341, and make voltages output from the hysteresis comparator circuit 341 more stable.

The direct current voltage adjusting circuit 343 includes a fourth resistor R4, a fifth resistor R5, a sixth resistor R6, a seventh resistor R7, a variable resistor R8, a first transistor Q1, a second transistor Q2, a first diode D1, a second diode D2, a power input terminal 346, a first input terminal 347, and a second input terminal 348. A resistance of the fourth resistor R4 is equal to a resistance of the sixth resistor R6. The power input terminal 346 is used for receiving a direct current voltage Vdd, and is grounded via the fifth resistor R5, the fourth resistor R4, the variable resistor R8, the sixth resistor R6, and the seventh resistor R7 in that order. The power input terminal 346 is connected to the common voltage output terminal 349 via the fifth resistor R5. The fourth resistor R4 is connected in parallel with the first diode D1. The first transistor Q1 includes a gate electrode (not labeled), a source electrode (not labeled), and a drain electrode (not labeled). The gate electrode of the first transistor Q1 is connected to the first input terminal 347. The source electrode of the first transistor Q1 is connected to an anode (not labeled) of the first diode D1. The drain electrode of the first transistor Q1 is connected to a cathode (not labeled) of the first diode D1 and the common voltage output terminal 349. The sixth resistor R6 is connected in parallel with the second diode D2. The second transistor Q2 includes a gate electrode (not labeled), a source electrode (not labeled), and a drain electrode (not labeled). The gate electrode of the second transistor Q2 is connected to the second input terminal 348. The source electrode of the second transistor Q2 is connected to an anode (not labeled) of the second diode D2. The drain electrode of the second transistor Q2 is connected to a cathode (not labeled) of the second diode D2. The first and second diodes D1, D2 are used for current limiting, to avoid too large currents from flowing through the first and second transistors Q1, Q2.

When the control circuit 31 provides a signal to the common voltage generating circuit 34, the hysteresis comparator circuit 341 adjusts the signal and outputs an alternating current voltage. Positive and negative amplitudes of the alternating current voltage are determined by the positive-negative dual power supply of the first operational amplifier 344. For example, if a positive power voltage of the first operational amplifier 344 is equal to 5V, the positive amplitude of the alternating current voltage is 5V; and if a negative power voltage of the first operational amplifier 344 is equal to −10V, the negative amplitude of the alternating current voltage is −10V. The direct current voltage adjusting circuit 343 receives a first control signal and a second control signal via the first and second input terminals 347, 348, respectively. The first and second control signals control the first and second transistors Q1, Q2 to turn on or turn off respectively, whereupon the direct current voltage adjusting circuit 343 can output a direct current voltage with a periodic change. The direct current voltage may be an impulse voltage with a reference voltage of 2.5V, a fluctuation amplitude of the impulse voltage being less than 2.5V. The direct current voltage output from the direct current voltage adjusting circuit 343 superimposes on the alternating current voltage output from the hysteresis comparator circuit 341 and the buffer circuit 342 to form a common voltage Vcom, and the common voltage Vcom is output by the common voltage output terminal 349.

Figure 4:
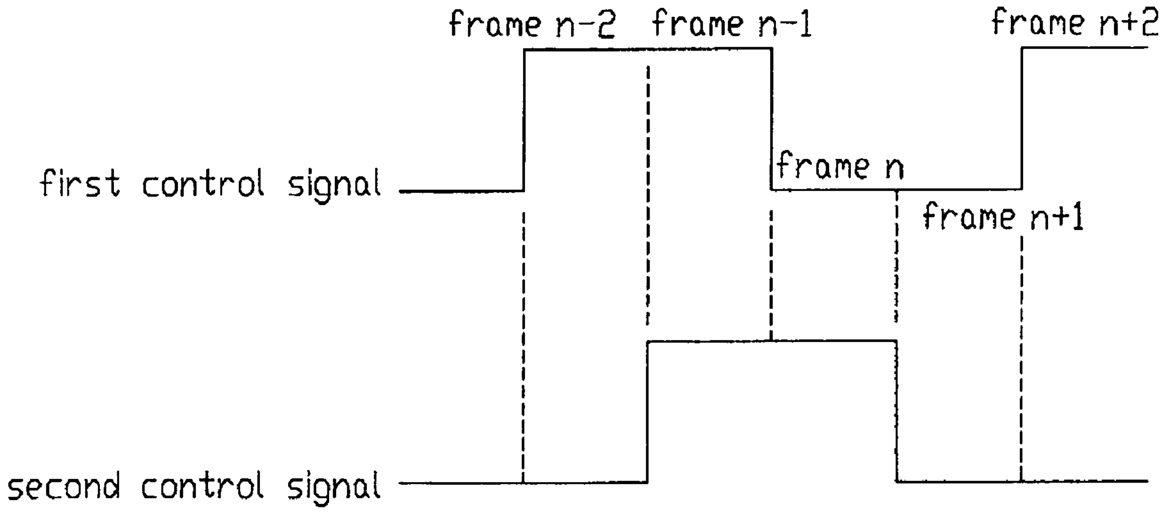
FIG. 4 is a waveform diagram of a first control signal received by the first input terminal and a second control signal received by the second input terminal of FIG. 3.
Figure 5:
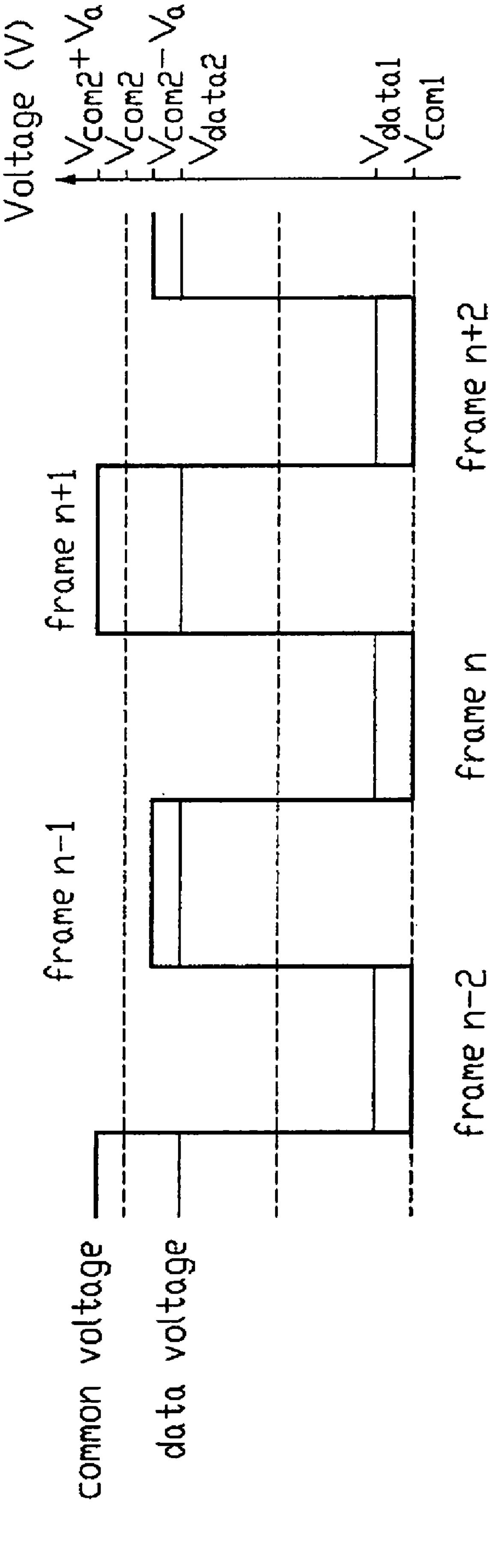
FIG. 5 is a waveform diagram of a data voltage and a common voltage applied to one of the pixel units of FIG. 2.

FIG. 4 is a waveform diagram of the first control signal and the second control signal. FIG. 5 is a waveform diagram of the data voltage and the common voltage applied to one of the pixel units. In frame n−2, the first control signal is a high level voltage, and the second control signal is a low level voltage. The first transistor Q1 is turned on and the second transistor Q2 is turned off. Then the fourth resistor R4 is in a short circuit state, and the direct current voltage Vout output from the direct current voltage adjusting circuit 343 is (R6+R7+R8)*Vdd/(R5+R6+R7+R8). If Vout is equal to the 2.5V reference voltage, the alternating current voltage Vac output from the hysteresis comparator circuit 341 is −10V, and the common voltage Vcom=(Vac+Vout)=−7.5V. Referring to FIG. 5, in the same frame, a data voltage Vdata1 is provided to the pixel electrode 26 of the pixel unit, and a common voltage Vcom1 is provided to the common electrode 22 of the pixel unit, where Vdata1<0, Vcom1=Vcom, Vcom1<0, and Vdata1>Vcom1.

In frame n−1, the first control signal is a high level voltage, and the second control signal is a high level voltage. The first transistor Q1 is turned on and the second transistor Q2 is also turned on. Then the fourth resistor R4 and the sixth resistor R6 are in a short circuit state, and the direct current voltage Vout output from the direct current voltage adjusting circuit 343 is (R7+R8)*Vdd/(R5+R7+R8). A fluctuation amplitude Va of the direct current voltage is (2.5−Vout), so then the direct current voltage Vout=2.5−Va. If the alternating current voltage Vac output from the hysteresis comparator circuit 341 is 5V, the common voltage Vcom=(Vac+Vout)=(5+2.5−Va)=(7.5−Va). Referring to FIG. 5, in the same frame, a data voltage Vdata2 is provided to the pixel electrode 26 of the pixel unit, and a common voltage (Vcom2−Va) is provided to the common electrode 22, where Vdata2=−Vdata1, Vdata2>0, Vcom2=−Vcom1, (Vcom2−Va)>0, Vcom2>Vdata2, Vdata2<(Vcom2−Va), and Va<Vcom2/5.

In frame n, the first control signal is a low level voltage, and the second control signal is a high level voltage. The first transistor Q1 is turned off and the second transistor Q2 is turned on. Then the sixth resistor R6 is in a short circuit state, and the direct current voltage Vout output from the direct current voltage adjusting circuit 343 is (R4+R7+R8)*Vdd/(R4+R5+R7+R8). Because the resistance of the fourth resistor R4 is equal to the resistance of the sixth resistor R6, if Vout is equal to the 2.5V reference voltage, the alternating current voltage Vac output from the hysteresis comparator circuit 341 is −10V, and the common voltage Vcom=(Vac+Vout)=−7.5V. Referring to FIG. 5, in the same frame, a data voltage Vdata1 is provided to the pixel electrode 26 of the pixel unit, and a common voltage Vcom1 is provided to the common electrode 22, where Vdata1<0, Vcom1=Vcom, Vcom1<0, and Vdata1>Vcom1.

In frame n+1, the first control signal is a low level voltage, and the second control signal is also a low level voltage. The first transistor Q1 is turned off and the second transistor Q2 is also turned off. Then the direct current voltage Vout output from the direct current voltage adjusting circuit 343 is (R4+R6+R7+R8)*Vdd/(R4+R5+R6+R7+R8)=(2.5+Va). If the alternating current voltage Vac output from the hysteresis comparator circuit 341 is 5V, the common voltage Vcom=(Vac+Vout)=(5+2.5+Va)=(7.5+Va). Referring to FIG. 5, in the same frame, a data voltage Vdata2 is provided to the pixel electrode 26 of the pixel unit, and a common voltage (Vcom2+Va) is provided to the common electrode 22, where Vdata2>0, (Vcom2+Va)>0, Vcom2>Vdata2, and Vdata2<(Vcom2+Va).

In frame n+2, the first control signal is a high level voltage, and the second control signal is a low level voltage. The first transistor Q1 is turned on and the second transistor Q2 is turned off. Then the fourth resistor R4 is in a short circuit state, and the direct current voltage Vout output from the direct current voltage adjusting circuit 343 is (R6+R7+R8)*Vdd/(R5+R6+R7+R8). That is, the first control signal and the second control signal in frame n+2 are the same as those in frame n−2, and the values of the data voltage and the common voltage in frame n+2 are the same as those in frame n−2. Therefore frame n−2, frame n−1, frame n, and frame n+1 define a minimum period. The first control signal and the second control signal in frame n+2 and the following frames repeat those of frame n−2, frame n−1, frame n, and frame n+1.

The above-described method for driving the LCD device 20 ensures that the voltage difference between the common voltage and the data voltage changes only fractionally between any two adjacent frames. Therefore the electric field of each pixel unit increases or decreases only a little between any two adjacent frames, and an angle between the direction of the electric field and the direction of an electric dipole moment of each liquid crystal molecule correspondingly increases or decreases only a little. Each such slight change in the angle between the direction of the electric field and the direction of the electric dipole moment of each liquid crystal molecule cannot be perceived by the human eye.

Because the value of the angle between the direction of the electric field and the direction of the electric dipole moment of each liquid crystal molecule changes only slightly between any two adjacent frames, a probability of random collision between the liquid crystal molecule and the impurity ions increases, and a random collision probability among the impurity ions correspondingly increases. A probability of the impurity ions being captured by the first and second alignment films 23 and 25 decreases, and a strength (value) of any residual direct current electric field between the first alignment film 23 and the second alignment film 25 correspondingly decreases. Thus any residual image phenomenon of the LCD device 20 can be mitigated effectively or even eliminated altogether.

Figure 6:
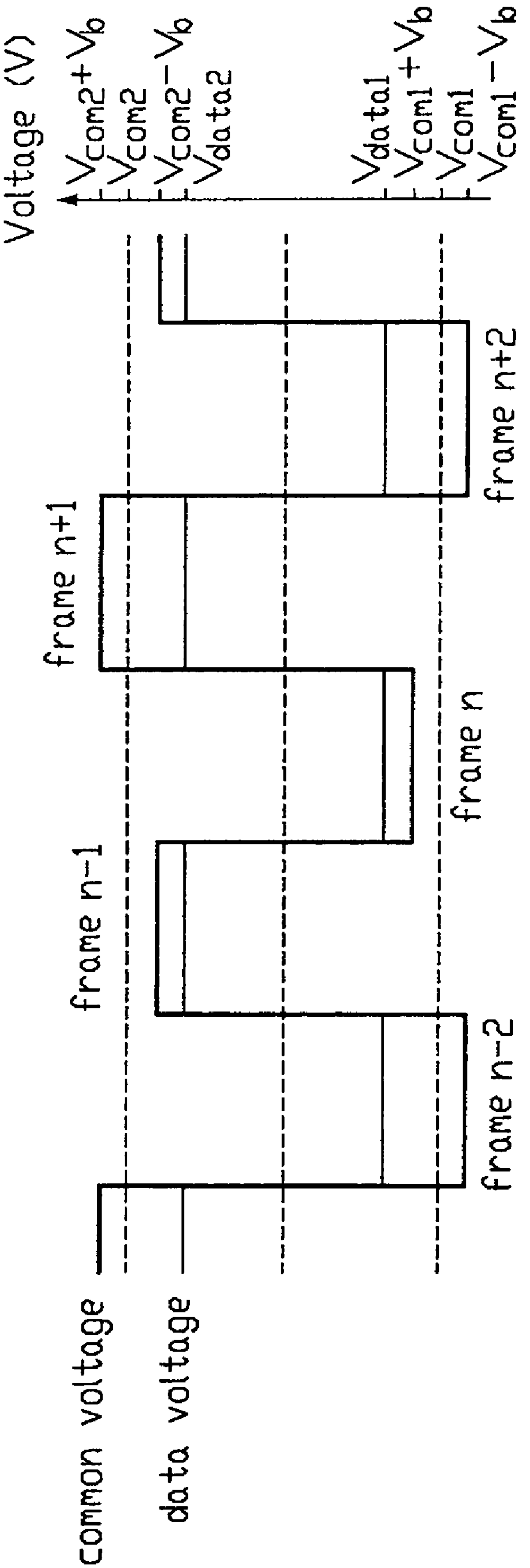
FIG. 6 is a waveform diagram of a data voltage and a common voltage applied to one of pixel units of an LCD device according to a second embodiment of the present invention.
Figure 7:
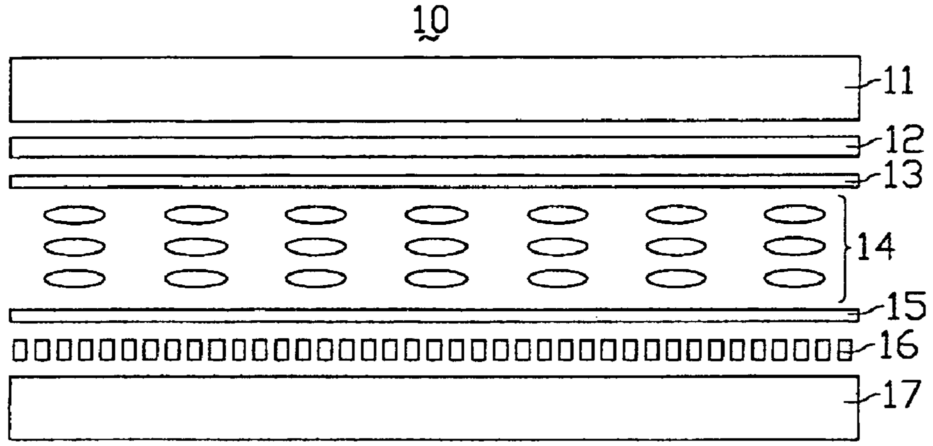
FIG. 7 (RELATED ART)
FIG. 7 is an exploded, side cross-sectional view of a conventional LCD device, the LCD device having a plurality of pixel units.
Figure 8:
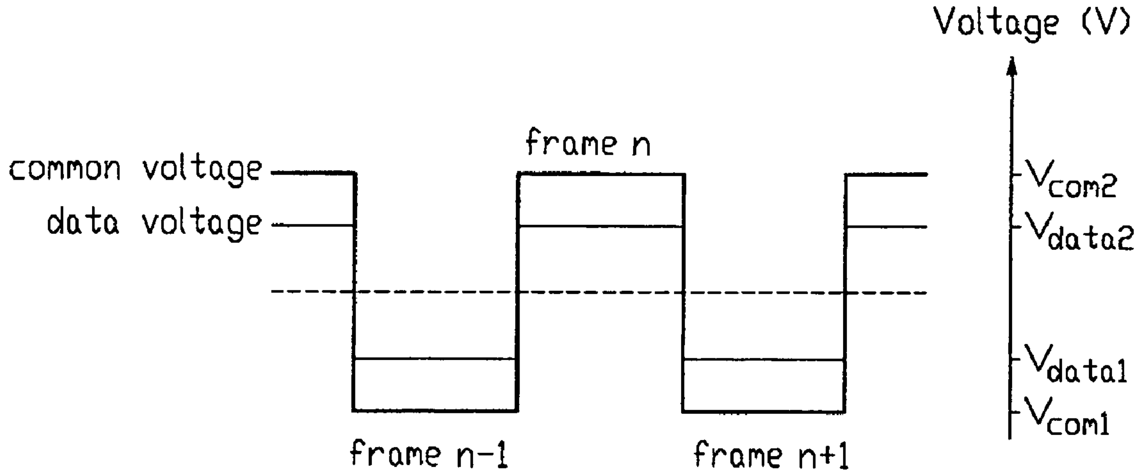
FIG. 8 (RELATED ART)
FIG. 8 is a waveform diagram of a data voltage and a common voltage applied to one of the pixel units of the LCD device of FIG. 7.

FIG. 6 is a waveform diagram of a data voltage and a common voltage applied to one of pixel units of an LCD device according to a second embodiment of the present invention. The data voltage and the common voltage are achieved according to corresponding first control signals and second control signals, in similar fashion to that described above in relation to the data voltage and the common voltage of the LCD device 20. In frame n−2, a data voltage Vdata1 is provided to a pixel electrode of the pixel unit, and a common voltage (Vcom1−Vb) is provided to a common electrode, where Vdata1<0, (Vcom1−Vb)<0, Vdata1>Vcom1, Vdata1>(Vcom1−Vb), and Vb<−Vcom 1/5, with Vb being a fluctuation amplitude of the direct current voltage.

In frame n−1, a data voltage Vdata2 is provided to the pixel electrode of the pixel unit, and a common voltage (Vcom2−Vb) is provided to the common electrode, where Vdata2=−Vdata1, Vdata2>0, Vcom2=−Vcom1, Vcom2>Vdata2, (Vcom2−Vb)>0, and Vdata2<(Vcom2−Vb).

In frame n, a data voltage Vdata1 is provided to the pixel electrode of the pixel unit, and a common voltage (Vcom1+Vb) is provided to the common electrode, where Vdata1<0, (Vcom1+Vb)<0, and Vdata1>(Vcom1+Vb).

In frame n+1, a data voltage Vdata2 is provided to the pixel electrode of the pixel unit, and a common voltage (Vcom2+Vb) is provided to the common electrode, where Vdata2>0, (Vcom2+Vb)>0, and Vdata2<(Vcom2+Vb).

In frame n+2, a data voltage Vdata1 is provided to the pixel electrode of the pixel unit, and a common voltage (Vcom1−Vb) is provided to the common electrode, where Vdata1<0, (Vcom1−Vb)<0, and Vdata1>(Vcom1−Vb). Therefore frame n−2, frame n−1, frame n, and frame n+1 define a minimum period. In frame n+2 and the following frames, the same sequence and pattern of the voltages of the minimum period are repeated.

The common voltage is generated by a common voltage generating circuit (not shown), and the common voltage generating circuit is substantially the same as the common voltage generating circuit 34 of the LCD device 20.

Thus, the LCD device of the second embodiment has substantially the same advantages as the LCD device 20.

According to the above descriptions, the common voltage is changed as follows: the common voltage is a sum of a main common voltage (Vcom1 or Vcom2), and an auxiliary voltage (Va or Vb) with a periodic change. An absolute value of the main common voltage is constant. The auxiliary voltage is less than one fifth of an absolute value of the main common voltage. In each pixel unit, a voltage difference between a data voltage and a common voltage is periodically changed. The auxiliary voltage is also less than the voltage difference between the data voltage and the common voltage of the pixel unit. In each two adjacent frames, the absolute value of the common voltage changes only a little.

It is to be understood, however, that even though numerous characteristics and advantages of preferred and exemplary embodiments have been set out in the foregoing description, together with details of the structures and functions of the embodiments, the disclosure is illustrative only; and that changes may be made in detail, especially in matters of shape, size, and arrangement of parts within the principles of the present invention to the full extent indicated by the broad general meaning of the terms in which the appended claims are expressed.

What is claimed is:

1. A liquid crystal display device, comprising:

a plurality of pixel electrodes;

a common electrode;

a data driving circuit configured for providing data voltages to each pixel electrode; and a common voltage generating circuit configured for providing a common voltage to the common electrode;

wherein the common voltage generating circuit comprises a hysteresis comparator circuit and a direct current voltage adjusting circuit, the hysteresis comparator circuit is configured for providing an alternating current voltage, the direct current voltage adjusting circuit is configured for providing a direct current voltage with periodic change, the direct current voltage is configured for superimposing on the alternating current voltage to form a common voltage, and an absolute value of the common voltage changes only slightly within a predetermined range from each frame to the next adjacent frame; and wherein the direct current voltage is an impulse voltage with a reference voltage, a fluctuation amplitude of the impulse voltage being less than the reference voltage.

2. The liquid crystal display device as claimed in claim 1, wherein the hysteresis comparator circuit comprises a first resistor, a second resistor, a third resistor, a first capacitor, and a first operational amplifier, one terminal of the capacitor is used for receiving signals from an external circuit, the other terminal of the capacitor is connected to a positive input terminal of the first operational amplifier via the first resistor, a negative input terminal of the first operational amplifier is grounded via the second resistor, and the third resistor is connected between the negative input terminal and an output terminal of the first operational amplifier.

3. The liquid crystal display device as claimed in claim 2, wherein the first operational amplifier has positive-negative dual power supply, and positive and negative amplitudes of the alternating current voltage are determined by the positive-negative dual power supply of the first operational amplifier.

4. The liquid crystal display device as claimed in claim 3, wherein the direct current voltage adjusting circuit comprises a fourth resistor, a fifth resistor, a sixth resistor, a seventh resistor, a variable resistor, a first transistor, a second transistor, a power input terminal, a first input terminal, and a second input terminal, the power input terminal is used for receiving a direct current voltage, and is grounded via the fifth resistor, the fourth resistor, the variable resistor, the sixth resistor, and the seventh resistor in that order, the first transistor comprises a gate electrode, a source electrode, and a drain electrode, the gate of the first transistor is configured as a first input terminal, the source and drain electrodes of the first transistor are connected in parallel with the fourth resistor, the second transistor comprises a gate electrode, a source electrode, and a drain electrode, the gate electrode of the second transistor is configured as a second input terminal, and the source and the drain electrodes of the second transistor are connected in parallel with the sixth resistor.

5. The liquid crystal display device as claimed in claim 4, wherein a resistance of the fourth resistor is equal to a resistance of the sixth resistor.

6. The liquid crystal display device as claimed in claim 4, wherein the first input terminal is configured for receiving a first control signal, the second input terminal is configured for receiving a second control signal, the first control signal and the second control signal periodically change, a minimum period is four frames comprising frame n−2, frame n−1, frame n, and frame n+1; the first control signal is a high level voltage and the second control signal is a low level voltage in frame n−2, the first control signal is a high level voltage and the second control signal is a high level voltage in frame n−1, the first control signal is a low level voltage and the second control signal is a high level voltage in frame n, and the first control signal is a low level voltage and the second control signal is a low level voltage in frame n+1.

7. The liquid crystal display device as claimed in claim 6, wherein the direct current voltage adjusting circuit further comprises a first diode and a second diode, the first diode comprises an anode and a cathode, the anode of the first diode is connected to the source electrode of the first transistor, the cathode of the first diode is connected to the drain electrode of the first transistor, the second diode comprises an anode and a cathode, the anode of the second diode is connected to the source electrode of the second transistor, and the cathode of the second diode is connected to the drain electrode of the second transistor.

8. The liquid crystal display device as claimed in claim 7, wherein the common voltage generating circuit further comprises a buffer circuit and a common voltage output terminal, the alternating current voltage provided by the hysteresis comparator circuit is configured for superimposing on the direct current voltage provided by the direct current voltage adjusting circuit via the buffer circuit, and the common voltage is output from the common voltage output terminal.

9. The liquid crystal display device as claimed in claim 8, wherein the buffer circuit comprises a second operational amplifier and a second capacitor, a positive input terminal of the second operational amplifier is connected to the output terminal of the first operational amplifier, a negative input terminal of the second operational amplifier is connected to an output terminal of the second operational amplifier, the second capacitor is an electrolytic capacitor, a positive terminal of the second capacitor is connected to the negative input terminal of the second operational amplifier, and a negative terminal of the second capacitor is connected to the common voltage output terminal.

10. The liquid crystal display device as claimed in claim 9, wherein the second operational amplifier has positive-negative dual power supply.

11. A liquid crystal display device, comprising:

a plurality of pixel electrodes;

a common electrode;

a data driving circuit configured for providing data voltages to each pixel electrode; and a common voltage generating circuit configured for providing a common voltage to the common electrode;

wherein the common voltage is a sum of a main common voltage with alternating polarity and an auxiliary voltage with periodic change from frame to frame, and an absolute value of the common voltage changes only slightly within a predetermined range from each frame to the next adjacent frame; and wherein an absolute value of the main common voltage is constant, and the auxiliary voltage is less than one fifth of the absolute value of the main common voltage.

12. The liquid crystal display device as claimed in claim 11, wherein the auxiliary voltage is less than a voltage difference between the data voltage and the common voltage of the pixel unit.

* * * * *